United States Patent [19]

Suzuki et al.

[11] 4,398,476

[45] Aug. 16, 1983

[54] METHOD FOR INCINERATING SEWAGE SLUDGE

[75] Inventors: Akira Suzuki, Kasukabe; Yasumi Shioya, Tokyo; Keiichi Kimura, Tsuchiura, all of Japan

[73] Assignee: Shinryo Air Conditioning Co., Ltd., Tokyo, Japan

[21] Appl. No.: 303,988

[22] Filed: Sep. 21, 1981

[30] Foreign Application Priority Data

Sep. 19, 1980 [JP] Japan .................................. 55-130308
Jul. 8, 1981 [JP] Japan .................................. 56-106338

[51] Int. Cl.$^3$ ........................ C10B 53/00; F23G 5/04; F23G 5/12
[52] U.S. Cl. .................................. 110/346; 48/197 A; 110/225; 110/238; 201/25; 201/27; 201/33
[58] Field of Search ........................ 201/2.5, 6, 15, 25, 201/27, 33, 34; 48/197 A; 110/247, 254, 257, 258, 346, 221, 224, 225, 238

[56] References Cited

U.S. PATENT DOCUMENTS

| | | | |
|---|---|---|---|
| 1,189,638 | 7/1916 | Testrup et al. | 201/215 |
| 2,121,662 | 6/1938 | Hartley et al. | 110/346 |
| 2,286,309 | 6/1942 | Rowen | 110/346 |
| 3,772,992 | 11/1973 | Menigat | 110/346 |
| 4,050,390 | 9/1977 | Hara et al. | |
| 4,116,136 | 9/1978 | Mallek et al. | 110/346 |
| 4,156,394 | 5/1979 | Mallek et al. | 110/346 |
| 4,201,141 | 5/1980 | Teodorescu et al. | 110/346 |
| 4,215,637 | 8/1980 | Lombana | 110/346 |

FOREIGN PATENT DOCUMENTS

| | | | |
|---|---|---|---|
| 29580 | 6/1981 | European Pat. Off. | 201/25 |
| 2245828 | 2/1974 | Fed. Rep. of Germany | 201/25 |
| 51-98144 | 8/1976 | Japan . | |
| 52-36574 | 3/1977 | Japan . | |
| 1364519 | 8/1974 | United Kingdom | 201/25 |
| 2030273 | 4/1980 | United Kingdom | 201/25 |

Primary Examiner—Bradley Garris
Attorney, Agent, or Firm—Oblon, Fisher, Spivak, McClelland & Maier

[57] ABSTRACT

A method and an apparatus of incinerating dewatered sludge without using an auxiliary fuel comprising pelletizing the partially dewatered sludge having a water content of 70 to 75%, drying the pellets with a heat source obtained by burning gases formed by dry-distillation and gasification, using part of the resulting dry-distilled gas in said drying step, dry-distilling the pellets by the sensible heat of a gas formed by gasification, gasifying the dry-distillation residues with air, water vapor and the remainder of said dry-distilled gas.

5 Claims, 3 Drawing Figures

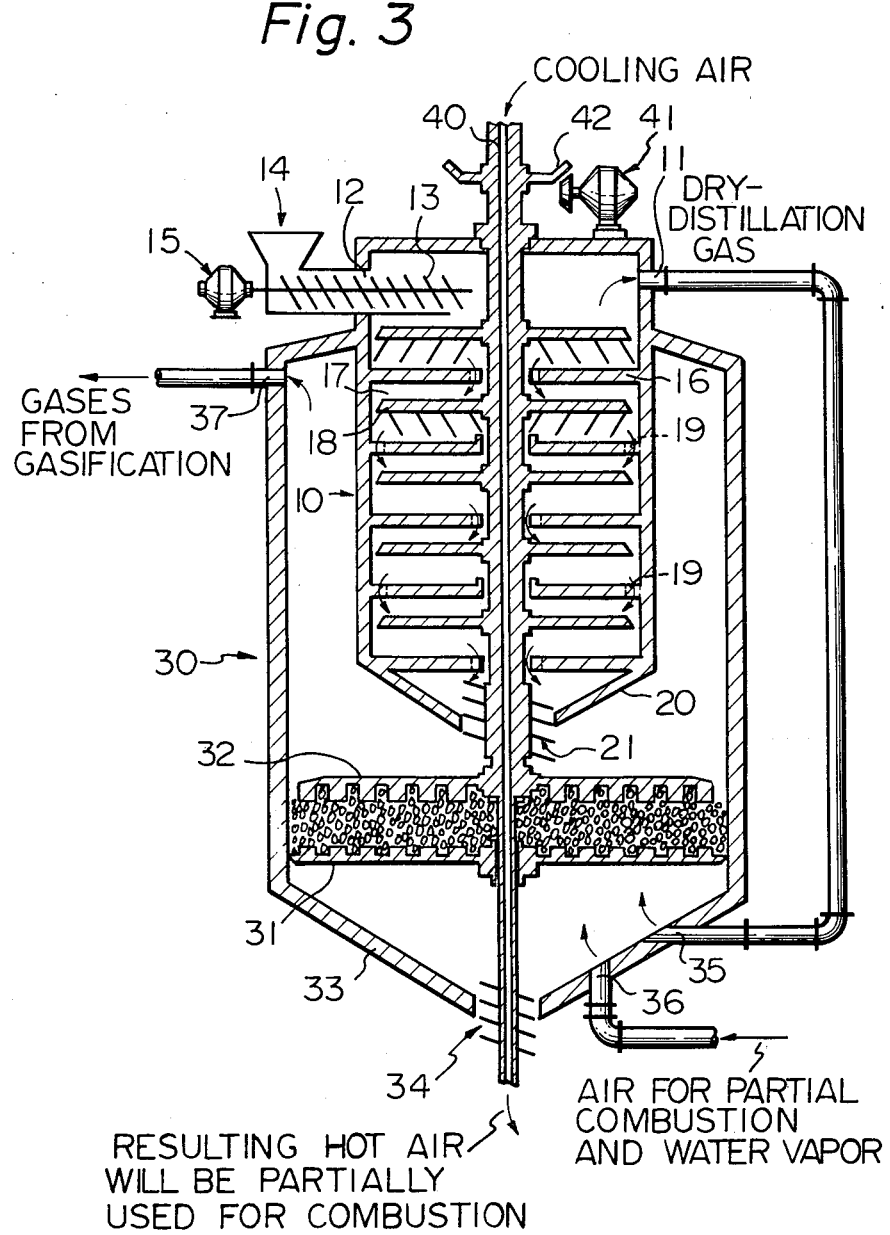

METHOD FOR INCINERATING SEWAGE SLUDGE

BACKGROUND OF THE INVENTION

1. Field of the Invention

This invention relates to a method of incinerating dewatered sludge obtained by dewatering excess sludge resulting from sewage treated by the activated sludge method. More particularly, the invention relates to a method of incinerating dewatered sludge wherein the dewatered sludge is dry-distilled in a non-oxidizing atmosphere and gasified and the resulting gases are used as a heat source for drying the sludge and for other purposes. And further, this invention relates to an apparatus for dry-distilling sludge and gasifying the resulting dry-distillation residue consisting primarily fixed carbon.

2. Description of Prior Art

Sludge originating from final treatment of sewage and human waste has in most cases been disposed of by being buried in the ground or being dumped in the sea after being dewatered to a certain water content. But these days, ground in which to bury the sludge is difficult to find, and the buried sludge can cause secondary pollution or the dumped sludge can pollute the ocean. So, sludge today is primarily disposed of by incineration. In addition, to prevent the formation of hexavalent chromium compounds due to burning as well as secondary pollution, from the formation of NOx and SOx in the burnt gas caused by combustion gas, several methods (See Japanese Patent Public Disclosure (KOKAI) Nos. 98144/1976 and 36574/1977.) are currently in use for dry-distillation of the sludge.

Sludge is difficult to dewater, and efficient, or economical dewatering with the dewatering apparatus generally produces the sludge which usually contains 70 to 75% of water. Such sludge has solids content that should, theoretically, produce more than enough heat necessary for evaporating the moisture content. However, though it appears to be theoretically possible to burn or dry-distill (the latter case includes effective use of the heat generated by fixed carbon) without requiring another heat source, the properties of the solids content may not permit the generation of so great an amount of heat, and in practice, an auxiliary fuel such as heavy oil has been necessary.

SUMMARY OF THE INVENTION

One object of this invention is to provide a method for incinerating dewatered sludge from sewage treatment wherein the sludge is dry-distilled and gasified by the heat source of its own without using an auxiliary fuel and the gas resulting from the dry-distillation and the gasification is effectively used as a heat source for drying the dewatered sludge and for other purposes.

Another object of this invention is to provide an apparatus for dry-distilling and gasifying dewatered sludge with high heat efficiency and completely incinerating the sludge without using an auxiliary fuel, and which is also capable of recovering the gases resulting from gasification and dry-distillation.

Other objects and advantages of the present invention may become apparent to those skilled in the art from the following description and disclosure.

BRIEF DESCRIPTION OF THE DRAWINGS

FIG. 3 is a schematic view of the apparatus of this invention according to one embodiment.

DETAILED DESCRIPTION OF THE PREFERRED EMBODIMENTS

The objects of the present invention are achieved by a method of incinerating dewatered sludge comprising dewatering excess sludge from sewage treated by the activated sludge method, pelletizing the partially dewatered sludge having a water content of 70 to 75%, drying the pellets with a heat source obtained by burning gases described hereunder which are formed by dry-distillation and gasification, dry-distilling the pellets by the sensible heat of the gas described hereunder which is formed by gasification, using part of the resulting dry-distilled gas in said drying step and the remainder in a gasifying step to be described hereunder, gasifying the residue from the dry-distillation step with the remainder of said dry-distilled gas, air and water vapor, discharging the residue in the form of ash, using the gas resulting from gasification in said drying step, to thereby achieve incineration of the dewatered sludge without using an auxiliary fuel.

Figure 1:
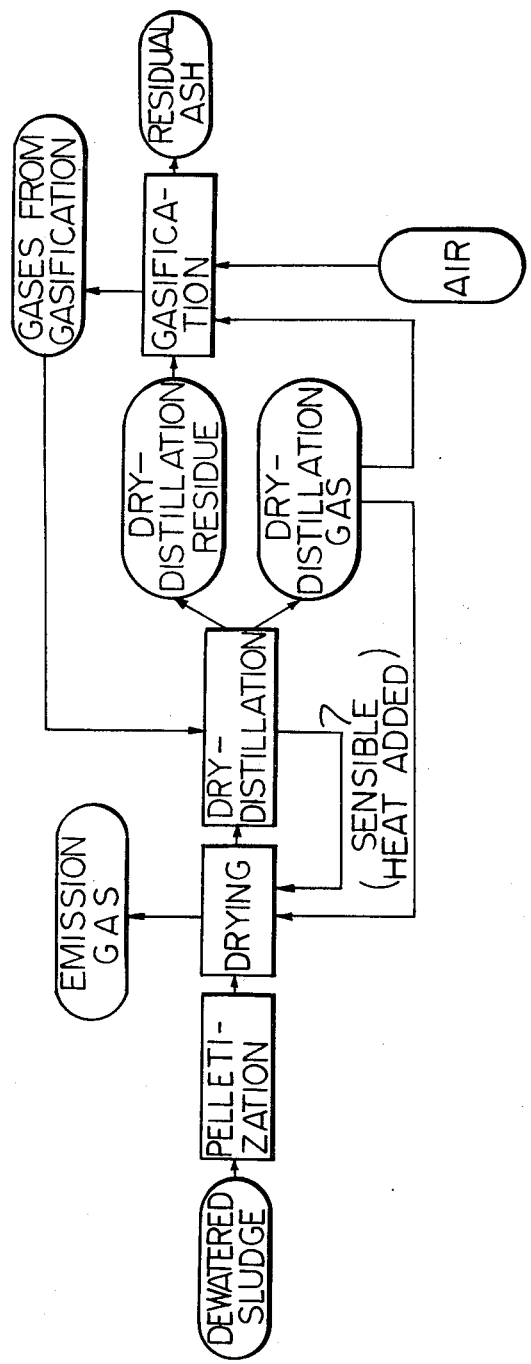
FIG. 1 is a flow sheet of the process of dry-distilling and gasifying dewatered sludge according to the present invention.

The method of this invention is hereunder described by reference to the flow sheet of FIG. 1.

Dewatered sludge obtained by dewatering excess sludge from sewage treatment generally contains 70 to 75% of water. In the method of this invention, this sludge having a water content of 70 to 75% is directly incinerated without using an auxiliary fuel. The use of sludge dewatered to a lower water content is of course preferred. In this case, not all the gas obtained by gasification is used in incinerating the sludge, but instead, the gas may be used for other purposes, for instance, it may be used in a waste heat boiler or retained in a gas holder temporarily.

In the method of this invention, the dewatered sludge is first pelletized. For this purpose, an extruder type pelletizer is generally used. The pellet size is desirably about 1 mm to about 10 mm to provide good heat efficiency in a dry-distillator, and for preventing the pellets from being carried away by the gas formed by dry-distillation. In our experiment, pellets 3 mm in size were used. And also, cylindrical form about 5 mm to about 10 mm in diameter and about 10 mm to about 20 mm long may be used.

The dewatered sludge in the form of pellets is sent to a dryer. Any conventional dryer used for drying sludge pellets may be used. In our experiment, a forced hot air agitator dryer was used: a draft of hot air (ca. 400° C.) obtained by burning gases resulting from dry-distillation and gasification was fed to the dryer where it was flowed countercurrently with the dewatered sludge pellets under agitation to dry them to a water content of about 10%. The temperature of the sludge pellets at the exit was about 150° C.

The dried sludge pellets are then dry-distilled by, for example, a vertical multi-stage dry-distiller oven. In the oven, the sludge pellets are heated by the hot surrounding gas that is formed in the subsequent gasifying step.

The oven has a shaft that rotates at 0.5 to 3 rpm and which is provided with a tier of floor plates each having an agitating blade. The dry sludge pellets are supplied overhead to the top floor plate and drop to the underlying floor plates in sequence through the openings made in the center and periphery, alternately, as it is moved from the center outward and vice versa by the rotation of the plates and the action of the blades. While the sludge pellets fall down the oven, they are heated at about 400° C. to about 600° C. at which temperature they are decomposed and about 63 wt% of them are gasified and recovered from the top of the oven as a dry-distilled gas. About 37 wt% of the sludge is recovered from the bottom of the oven as a dry-distillation residue containing fixed carbon, undecomposed organic matter and ash, and is fed to the subsequent gasifying step.

In the gasifying step, the fixed carbon in the dry-distillation residue is gasified. The heat source in this step is the gas resulting from the dry-distillation. The carbon dioxide and water vapor formed by the burning of the dry-distillation gas, oxygen in air, and the fixed carbon in the dry-distillation residue undergo the following reactions to produce carbon monoxide and hydrogen gas:

$$C + \tfrac{1}{2}O_2 = CO + 29400 \text{ kcal/kmol}$$

$$C + CO_2 = 2CO - 38200 \text{ kcal/kmol}$$

$$C + H_2O = CO + H_2 - 28200 \text{ kcal/kmol}$$

The undecomposed organic matter in the dry-distillation residue and the hydrocarbons in the dry-distillation gas are reacted with water vapor and oxygen to form carbon monoxide and hydrogen as the product of secondary gasification.

$$C_mH_n + mH_2O \longrightarrow mCO + \tfrac{2m+n}{2} H_2$$

$$C_mH_n + \tfrac{m}{2} O_2 \longrightarrow mCO + \tfrac{n}{2} H_2$$

The gases obtained by the primary and secondary gasifications are returned to the dry-distillation step where they release their sensible heat to the sludge pellets and are used as a heat source in the drying step. When the overall heat balance of the process of incineration of dewatered sludge is in surplus, part of the gases resulting from the gasification is stored in a holder for subsequent use. The ash (the residue from the gasifying step) is recovered from the bottom of the oven.

One embodiment of the method of this invention is now described. Sludge (solids content: 2-3%) from a sludge thickener in a sewage treatment plant in Saitama, Japan was dewatered with a roll press type dewatering machine to a solids content of 25%. The sludge had the elemental analysis indicated in Table 1 below.

TABLE 1

| Elemental analysis of dewatered sludge (percentage on dry basis) | | | | | |
|---|---|---|---|---|---|
| Carbon | Hydrogen | Oxygen | Nitrogen | Chromium (III) | Others |
| 53.1 | 7.3 | 17.0 | 2.8 | 0.1 | 19.7 |

The sludge was fed into an extruding pelletizer to form pellets 3 mm in size. The pellets were dried in a forced hot air agitator dryer with a draft of hot air (400° C.) obtained by burning gases resulting from gasification and dry-distillation. Dried sludge pellets with a water content of 10% were obtained.

The dry sludge pellets were fed into a dry-distillator where they were dry-distilled at 450° C. for 20 minutes to provide dry-distillation gases, fixed carbon and ash. The amounts of the dry-distillation gases per kilogram of the dewatered sludge pellets on a dry basis are set forth in Table 2. The values in the following pages (excepting those indicated by percentage) are based on 1 kg of the dewatered sludge. The temperature of the dry-distillation gas at the exit was 200° C. The composition of the dry-distillation product is indicated in Table 3.

TABLE 2

| Dry-distillation gases (l/kg of sludge on a dry basis) | | | | |
|---|---|---|---|---|
| CO | H₂ | CmHn | CO₂ | tot. |
| 182 | 350 | 65 | 116 | 713 |

TABLE 3

| Composition of dry-distillation product (in percent of dry-distillation product) | | |
|---|---|---|
| Volatile matter | Fixed carbon | Ash |
| 56.7 | 23.4 | 19.7 |

The amount of heat generated by the respective dry-distillation gases is calculated by the following three formulas and set forth in Table 4. Two thousand five hundred liters of air is necessary for burning 713 l of the dry-distillation gases.

$$CO + \tfrac{1}{2}O_2 = CO_2 + 68.2 \text{ kcal/mol}$$
$$H_2 + \tfrac{1}{2}O_2 = H_2O + 57.6 \text{ kcal/mol}$$

$$C_mH_n + (m + n/4)O_2 = mCO_2 + \tfrac{n}{2} H_2O + Hg \text{ (Hg: amount of total heat generated)}$$

TABLE 4

| Amount of heat generated by dry-distillation gases (kcal/kg of sludge on a dry basis) | | | |
|---|---|---|---|
| CO | H₂ | CmHn | tot. |
| 552 | 899 | 969 | 2420 |

(3394 kcal generated per Nm³ of the dry-distillation gases)

The fixed carbon (234 g) in the dry-distillation residue was reacted with 180 g of water vapor and 440 g of carbon dioxide at 1000° C. for 30 minutes. The gasification of the fixed carbon consisted of the aqueous gas reaction is represented by:

$$C + H_2O \rightleftharpoons CO + H_2 - 28.2 \text{ kcal/mol}$$

and the producer gas reaction is represented by:

$$C + CO_2 = 2CO - 38.2 \text{ kcal/mol},$$

which reactions are taking place simultaneously.

The total amount of the gases resulting from the gasification was 3573 liters/kg of the sludge on a dry basis. The amounts of the respective gases and the amount of the heat generated by CO and $H_2$ are set forth in Tables 5 and 6, respectively.

TABLE 5

Analysis of the gases resulting from gasification (l/kg of sludge on a dry basis)

| CO | $H_2$ | $H_2O$ | $CO_2$ | $N_2$ | tot. |
|---|---|---|---|---|---|
| 672 | 224 | 448 | 235 | 1994 | 3573 |

TABLE 6

Heat generated by CO and $H_2$ (kcal/kg of sludge on a dry basis)

| CO | $H_2$ | tot. |
|---|---|---|
| 2046 | 576 | 2622 |

The heat balance of each step and the overall heat balance are given below. The values in each table are represented by kcal per kg of the sludge on a dry basis.

| heat in (kcal) | | heat out (kcal) | |
|---|---|---|---|
| (a) Drying step | | | |
| heat from sludge | 4372 | heat from sludge | 4372 |
| sensible heat of sludge | 64 | sensible heat of sludge | 33 |
| heat from gases resulting from gasification | 2622 | latent and sensible heats of water vapor | 1853 |
| sensible heat of gases resulting from gasification | 701 | heat from emission gas | 1384 |
| heat from dry-distillation gas | 890 | sensible heat of emission gas | 370 |
| sensible heat of dry-distillation gas | 17 | latent and sensible heats of water vapor | 73 |
| latent and sensible heats of water vapor | 73 | heat loss | 654 |
| tot. | 8739 | tot. | 8739 |
| (b) Dry-distillation step | | | |
| heat from sludge | 4372 | heat from dry-distillation gas | 2420 |
| sensible heat of sludge | 33 | sensible heat of dry-distillation gas | 45 |
| sensible heat of gases resulting from gasification | 128 | latent and sensible heats of water vapor | 73 |
| | | heat from fixed carbon | 1952 |
| | | sensible heats of ash and fixed carbon | 39 |
| | | heat loss | 4 |
| tot. | 4533 | tot. | 4533 |
| (c) Gasification step | | | |
| heat from fixed carbon | 1952 | heat from gases resulting from gasification | 2622 |
| sensible heats of fixed carbon and ash | 39 | sensible heat of gases from gasification | 701 |
| heat from gases from dry-distillation | 1530 | sensible heat of gases from gasification (dry-distilled) | 128 |
| sensible heat of dry-distillation gases | 28 | sensible heat of ash | 39 |
| sensible heat of air | 14 | heat loss | 73 |
| tot. | 3563 | tot. | 3563 |
| (d) Overall | | | |
| heat from sludge | 4372 | heat from emission gas | 1384 |
| sensible heat of sludge | 64 | sensible heat of emission gas | 370 |
| sensible heat of air | 14 | latent and sensible heats of water vapor | 1853 |
| | | latent and sensible heats of water vapor | 73 |
| | | sensible heat of ash | 73 |
| | | heat loss | 731 |
| tot. | 4450 | tot. | 4450 |

Figure 2:
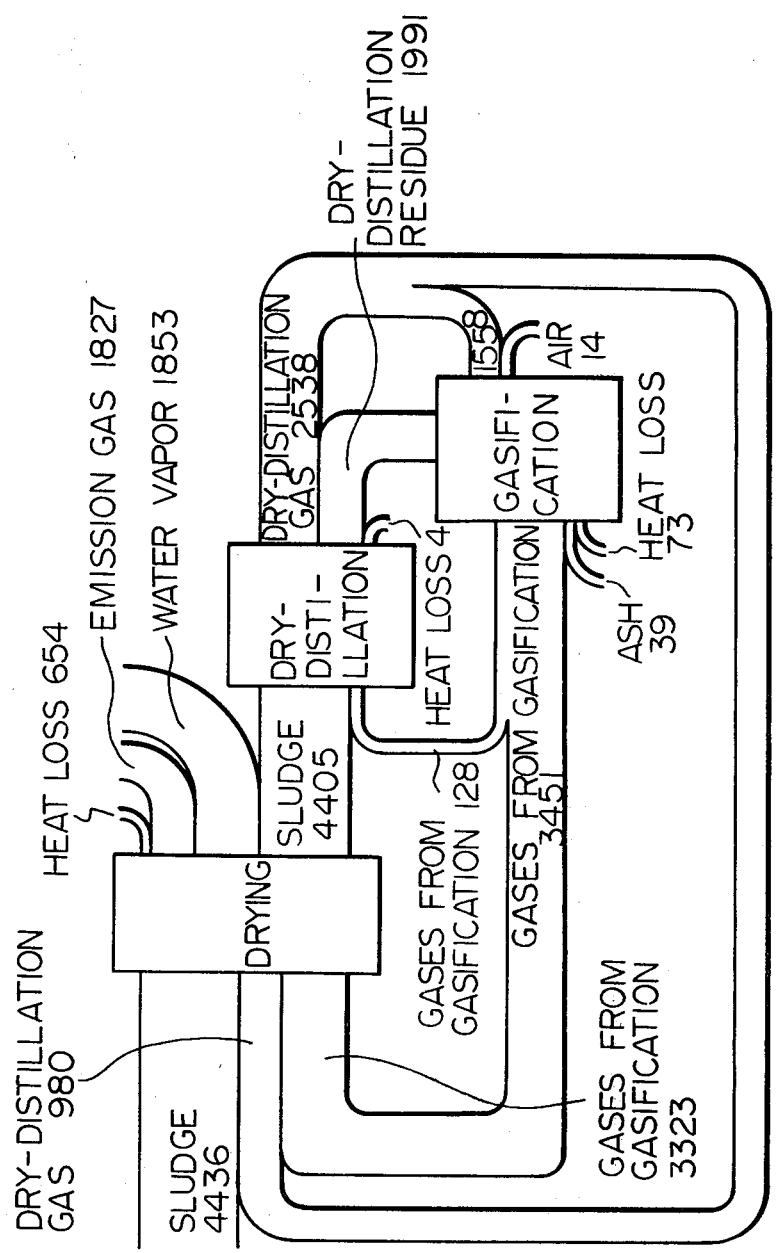
FIG. 2 is a heat flow sheet of the process of dry-distilling and gasifying dewatered sludge according to this invention.

The overall heat balance is shown in the heat flow sheet of FIG. 2 (unit: kcal/kg of sludge on a dry basis).

Being characterized by the foregoing features, the method of this invention is capable of incinerating dewatered sludge by making effective use of the potential heat of the sludge without supply of external heat. As a further advantage, if sludge of appreciably low water content is used, a surplus of heat is recovered, and the gases resulting from gasification can be stored for subsequent use.

The apparatus according to this invention is characterized by the following features (a) to (d):

(a) a dry-distiller oven in the form of a vertical cylinder is encased by the upper portion of a gasifying oven in the form of a vertical cylinder of a larger diameter than that of the dry-distiller oven, the wall of the gasifying oven surrounding the dry-distiller oven and extending upward to a position which is slightly lower than the upper periphery of the dry-distiller oven and at which position, the gasifying oven is joined to the dry-distiller oven, a rotary shaft being provided through the center of the dry-distiller oven and the gasifying oven;

(b) the dry-distilling oven having in the top an inlet for supplying sludge pellets and an outlet for recovering the gas formed by dry-distillation, the dry-distiller oven being divided into a tier of floor plates, the compartments defined by the floor plates having agitator blades that are fixed to the rotary shaft for transferring the sludge from the center outward and vice versa alternately, the floor plates having holes in the center and on the periphery alternately, through which the sludge pellets drop, the bottom of the dry-distiller oven being in the form of an inverted cone, a feeder for causing the dry-distillation residue to drop in the gasifying oven being provided between the bottom of the dry-distiller oven and the rotary shaft;

(c) the gasifying oven having a fixed grate and an arm for smoothing the dry-distillation residue retained on the grate, said arm being integral with the rotary shaft, the bottom of the gasifying oven being an ash storage in the form of an inverted cone, a feeder for discharging ash being provided between the bottom of the gasifying oven and the rotary shaft, the ash storage being provided with inlets for supplying the dry-distillation gas, air and water vapor, the top of the oven being provided with an outlet for recovering the gases resulting from gasification; and (d) cooling air being supplied through the rotary shaft to cool the rotary shaft, and optionally at least one of the agitator blades, and smoothing arm, and the heated air from the rotary shaft being usable as air in the gasifying oven.

The sludge to be treated by the apparatus of this invention originates from the treatment of all household wastes including human waste. Sludge obtained by treatment of industrial wastes can also be used if it contains much organic matter. The solids content in the sludge usually generates at least 4,000 kcal per kg on an absolute dry basis, which is sufficient to evaporate water weighing about seven times as much as the solids content. Therefore, theoretically, with minimum heat loss, sludge dewatered to a water content of about 85% can be dried and incinerated without an auxiliary fuel. But this is difficult to achieve with the common apparatus. The conventional apparatus can treat sludge that is dewatered to a water content of about 65% at maximum.

The apparatus of this invention can treat sludge dewatered to a water content of 70 to 75%. But in this case, the sludge must be dried in the topmost compartment of the dry-distillation oven and this is one factor that increases the size of the dry-distillation oven. In addition, the resulting dry-distillation gas contains much water vapor which must in many cases be removed before the dry-distillation gas is usable as a fuel. Preferably, the sludge is treated by the apparatus of this invention after it is dried to a water content less than 70–75% in a separate efficient dryer with the gases resulting from dry-distillation and gasification in the apparatus of this invention.

One embodiment of the apparatus of this invention is hereunder described by reference to FIG. 3. The apparatus comprises a dry-distillation oven 10 in the form of a vertical cylinder which is encased by the upper portion of a gasifying oven 30 in the form of a vertical cylinder of a larger diameter than that of the dry-distillation oven 10. The wall of the gasifying oven 30 surrounds the dry-distillation oven 10 and extends upward to a position which is slightly lower than the upper periphery of the dry-distillation oven 10 and at which position, the gasifying oven 30 is joined to the dry-distillation oven 10. A rotary shaft 40 is provided through the center of the dry-distillation oven 10 and the gasifying oven 30. The shaft 40 is rotated by drive means 41 in the top of the oven 10 through a gear 42.

An outlet 11 for recovering dry-distillation gas and an inlet 12 for feeding the sludge are provided in the top of the oven 10. In the illustrated embodiment, a screw feeder 13 is mounted at the inlet 12, and sludge pellets fed through a hopper 14 are supplied to the interior of the oven 10 by a screw feeder 13 rotated by drive means 15. The oven 10 is divided into a tier of floor plates (5 floor plates are shown in the illustrated embodiment). The compartments 17 defined by the floor plates 16 have agitator blades 18 that are fixed to the rotary shaft 40 for transferring the sludge pellets from the center outward and vice versa alternately. The floor plates 16 have holes 19, in the center and on the periphery alternately, through which the sludge pellets drop. The bottom 20 of the dry-distillation oven 10 is in the form of an inverted cone to define a space of a circular cross section between the bottom 20 and the shaft 40. A screw feeder 21 is provided around the shaft 40 within said space. The diameter of the screw feeder 21 is such that the screw contacts the bottom 20. The dry-distillation residue dropping from the last floor plate is forced down by the feeder 21 into the gasifying oven while the feeder prevents the passage of gas. It is preferred that the screw feeder 21 completely prevents gas flow.

The sludge pellets supplied by the screw feeder 13 are transferred along the floor plates 16 from the center outward and vice versa alternately by the action of the blades 18 and drop through the holes 19 in sequence as they are dry-distilled. The residue is sent to the gasifying oven 30 by the screw feeder 21 and the dry-distillation gas is recovered through the outlet 11.

A fixed grate 31 and a smoothing arm 32 integral with the shaft 40 are provided within the gasifying oven 30. The smoothing arm 32 smoothes the dry-distillation residue retained on the grate 31. The gasifying oven 30 has an ash storage 33 under the grate 31, and like the bottom 20 of the dry-distillation oven 10, the ash storage is in the form of an inverted cone, and a screw feeder 34 for discharging the ash while cutting gas flow is provided between the ash storage 33 and the shaft 40.

The screw feeder 34 need not provide complete cutting of gas flow. The ash storage 33 is provided with an inlet 35 for recovering the dry-distillation gas and an inlet 36 for feeding air for partial combustion, and water vapor that is additionally supplied as required. An outlet 37 for recovering the gases resulting from gasification is provided in the top of the gasifying oven 30.

The rotary shaft 40 is hollow. If necessary, at least one of the blades 18 and smoothing arm 32 is hollow. Air is fed through the hollow part of these elements from the top of the shaft 40, and after cooling the respective elements, the heated air is recovered from the bottom of the shaft 40. The piping of the apparatus of this invention is so designed that the heated air can be used as air in the gasifying oven 30.

As described above, the sludge pellets supplied continuously from the hopper 14 are forced down through the dry-distillation oven 10 by passing through the floor plates 16 in sequence. As they drop through the floor plates 16, the sludge pellets are first dried by the wall of the oven heated by the hot gases coming from the gasifying oven 30, and subsequently dry-distilled. Alternatively, the sludge pellets are dry-distilled as they are dried. Dry-distillation of the sludge pellets is substantially completed at about 400° C. to about 600° C. The resulting water vapor and dry-distillation gas are recovered from the outlet 11. The dry-distillation residue is primarily made of fixed carbon and ash and contains a small amount of undecomposed organic matter.

The dry-distillation residue discharged from the oven 10 stays on the fixed grate 31 in the gasifying oven 30. The ash storage 33 under the grate 31 is supplied with the dry-distillation gas and air, and optionally water vapor, through the inlets 35 and 36, and the dry-distillation gas is burnt to produce a hot gas which passes through the grate 31 to reach the bed of dry-distillation residue on the grate. The residue is heated and reacted with the carbon dioxide and water vapor formed by the burning of the dry-distillation gas, as well as oxygen in air and the water vapor supplied, and the resulting hot gas flows between the wall of the gasifying oven 30 and the dry-distiller oven 10 to heat the dry-distillation oven 10. The gas, the temperature of which is now low, is recovered through the outlet 37. The ash (the gasification residue) is removed through the feeder 34. The heated air from the shaft 40 can be used for burning the dry-distillation gas.

Being characterized by the foregoing features, the apparatus of this invention can dry-distill, gasify and incinerate dewatered sludge without using an auxiliary fuel, and also, it recovers the heat of the gases obtained by gasification, or the heat of the gases resulting from gasification and dry-distillation. The sludge is not simply burnt in the apparatus of this invention; it is dried, dry-distilled and then burnt, so the emission gas contains a small proportion of pollutants and can be treated by a simple method. The resulting ash contains only a small amount of hexavalent chromium compounds. Therefore, the apparatus of this invention has great industrial advantage.

One example of the specifications and operating data of the apparatus of this invention is given below.

1. Specifications of the apparatus
   (1) dry-distiller oven
       dia.    270 mm
       ht.     700 mm

|     |     |     |
| --- | --- | --- |
|     | compartments | 5 |
| (2) | gasifying oven | |
|     | dia. | 300 mm |
|     | ht. | 1000 mm |
|     | (ht. at which the dry-distiller oven is surrounded by gasifying oven 500 mm) | |
| (3) | rotary shaft | |
|     | speed | 2 rpm |
| 2. Operating data | | |
| (1) | sludge fed in | |
|     | $H_2O$ cont. | 10% |
|     | heat generated by solids content | 4372 kcal/kg-DS |
|     | feed rate | 1.0 kg-DS/hr |
| (2) | dry-distillation gas | |
|     | amount | 850 l/hr |
|     | temp. | 350° C. |
|     | $H_2O$ cont. | 16% (vol %) |
|     | heat generated | 2847 kcal/$Nm^3$ |
| (3) | tem. of dry-distillation oven | |
|     | top | 350° C. |
|     | middle | 420° C. |
|     | bottom | 450° C. |
| (4) | gases from gasification | |
|     | amount generated | 2096 l/hr |
|     | temp. | 800° C. |
|     | $H_2O$ cont. | 2.2% (vol %) |
|     | heat generated | 1251 kcal/$Nm^3$ |
| (5) | ash | |
|     | amount | 197 g/hr |
|     | temp. | 1000° C. |
| (6) | gasifying oven | |
|     | supply of dry-distillation gas | 471 l/hr |
|     | air supply | 1390 l/hr |
|     | water vapor supply | 81 l/hr |
|     | temp. of gasified bed | 800° C. |
| (7) | cooling of shaft | |
|     | air flow | 640 l/hr |
|     | inlet temp. | 20° C. |
|     | outlet temp. | 1000° C. |

What is claimed is:

1. A method of incinerating sewage sludge which comprises the steps of:
   (a) pelletizing dewatered sludge having a water content of 70 to 75% which is obtained by dewatering excess sludge from sewage treatment,
   (b) drying the pellets with a heat source obtained by burning gases described hereunder which are formed by dry-distillation and gasification,
   (c) dry-distilling the pellets by the sensible heat of the gas described hereunder which is formed by gasification,
   (d) using part of the resulting dry-distilled gas in said drying step,
   (e) burning the remainder of the resulting dry-distilled gas in the presence of air and water vapor,
   (f) gasifying the residue from the dry-distillation step with the gas resulting from said burning step,
   (g) using the gas resulting from said gasification step in said drying step and said dry-distillation step, and
   (h) discharging the residue in the form of ash resulting from said gasification step, to thereby achieve incineration of the dewatered sludge without an auxiliary fuel.

2. The process of claim 1 in which said pellets are about 1 mm to about 10 mm in size.

3. The process of claim 1 in which said pellets are cylindrical forms about 5 mm to about 10 mm in diameter and about 10 mm to about 20 mm long.

4. The process of claim 1 in which said dry-distillation is carried out at a temperature of from about 400° C. to about 600° C.

5. The process of claim 1 in which said dry-distillation is carried out at about 450° C. for about 20 minutes.

* * * * *